July 10, 1951 A. W. FRIEND 2,560,430

MAGNETO-OPTICAL TRANSDUCER SYSTEM

Filed Aug. 27, 1949

INVENTOR.
ALBERT W. FRIEND
BY [signature]
ATTORNEY.

Patented July 10, 1951

2,560,430

UNITED STATES PATENT OFFICE 2,560,430

MAGNETO-OPTICAL TRANSDUCER SYSTEM

Albert W. Friend, Lawrenceville, N. J., assignor to Radio Corporation of America, a corporation of Delaware Application August 27, 1949, Serial No. 112,785

9 Claims. (Cl. 179—100.2)

This invention relates to sound reproduction, and particularly to a magneto-optical transducer system and head therefor for translating magnetic records into light and sound variations, the invention also being useful for rerecording magnetic sound records to photographic sound records, as disclosed and claimed in co-pending U. S. application, Ser. No. 23,897, filed April 29, 1948, now U. S. Patent No. 2,485,839 of October 25, 1949.

The transfer system disclosed in the above-identified copending application, linearly translates magnetic variations into light variations independently of frequency. That is, the system has a substantially flat frequency response characteristic which avoids the use of equalization during reproduction, as now required in inductive-magnetic reproducers. The system utilizes a magnetic core having a pair of diametrically opposed gaps, the magnetic record being advanced past one of said gaps to vary the magnetism in said core, while an optical element positioned in the other gap rotates the beam of light passing between two polarizing prisms, thus varying the intensity or quanta of light passing the last prism. If the light falls on a photocell, the magnetic record may be reproduced, and, if it falls on a film, a photographic record may be recorded. The light beam varies in intensity in direct proportion to the variation in magnetism in the magnetic record.

The present invention is directed to the same general system, but is an improvement thereover to increase the sensitivity and efficiency between the variations in magnetism and the variations in light intensity. A special type of electro-optical head is employed, which, for certain variations in magnetism, produces a greater light variation than prior devices.

A system for reproducing magnetic records without inductive elements is disclosed and claimed in U. S. Patent No. 2,165,307 of July 11, 1939, and an electro-optical system of the same general type is disclosed and claimed in U. S. Patent No. 1,961,706 of June 5, 1934. The first patent uses a cathode ray electron tube, and the latter patent uses inductive windings.

The principal object of the invention, therefore, is to facilitate the translation of magnetic records into corresponding light or sound variations.

Another object of the invention is to increase the efficiency of translating magnetic variations into light variations.

A further object of the invention is to provide an improved magneto-optical head for translating magnetic variations into light variations.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
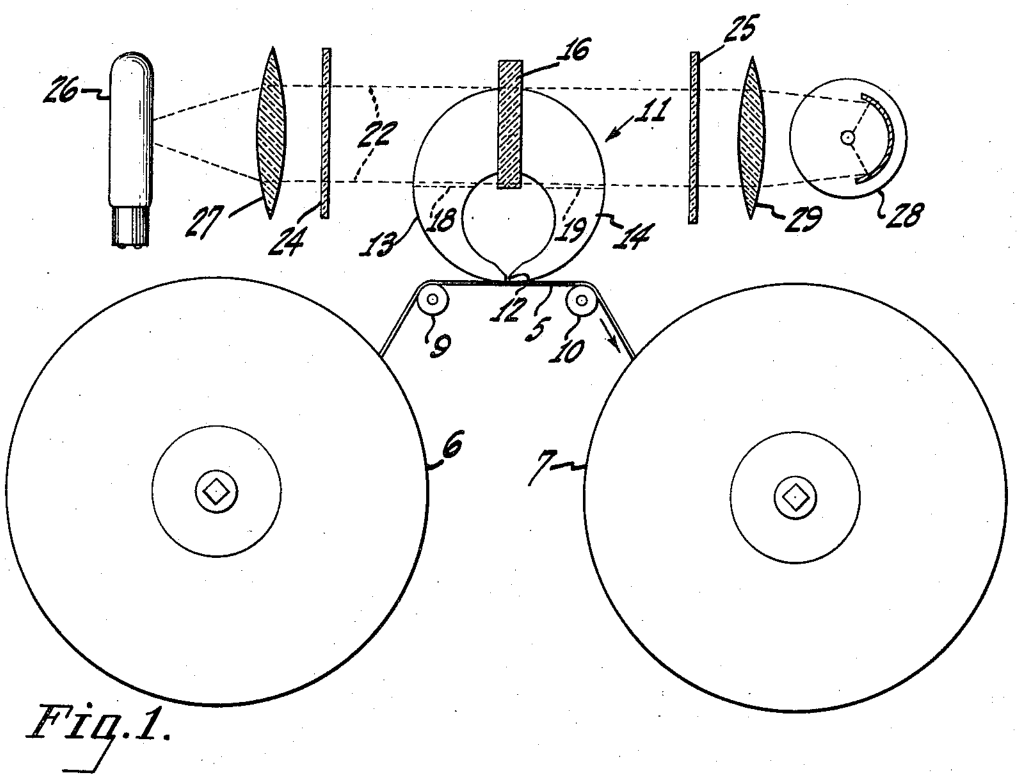
Fig. 1 is a diagrammatic view of a magnetic record-to-sound translating system embodying the new head of the invention.
Figures 2, 3:
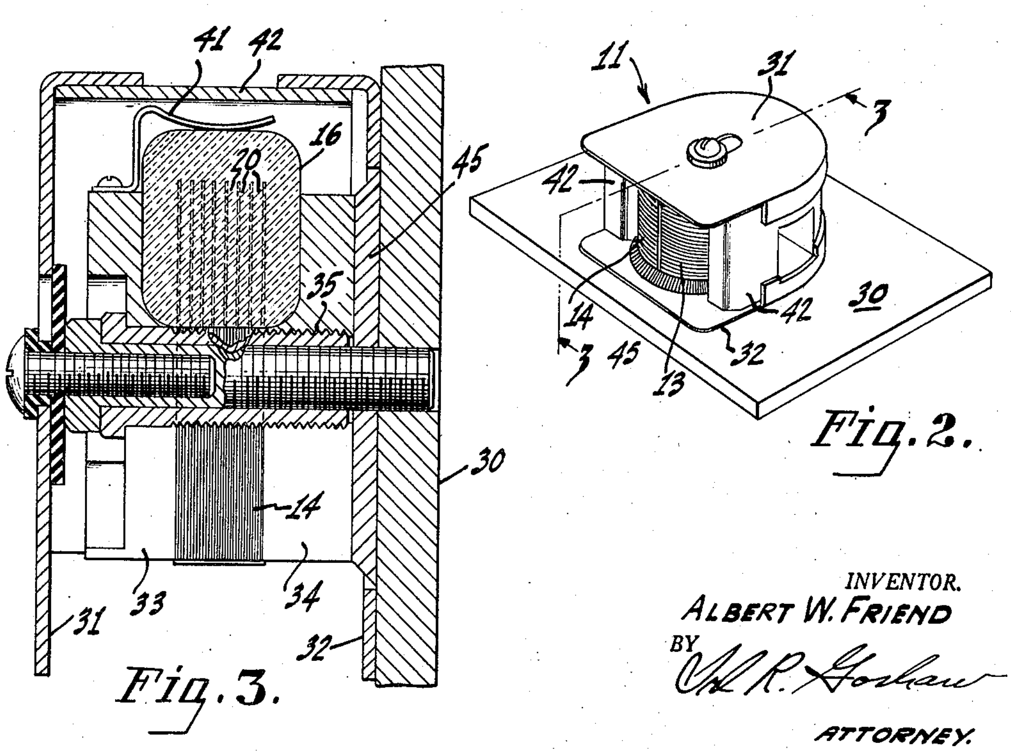
Fig. 2 is a perspective view of the head used in the system of Fig. 1.
Fig. 3 is a cross-sectional view of the head taken along the line 3—3 of Fig. 2.

Referring now to the drawings, in which the same numerals identify like elements, a magnetic tape 5 or other type of magnetic medium is shown passing from a supply reel 6 to a takeup reel 7 over guide rollers 9 and 10, as indicated by the arrow, the tape being advanced in any suitable manner, not shown. The magnetic tape is shown passing a pickup gap 12 in a quasi-toroidal head 11, which has two similar sections 13 and 14, each of which is made up of a plurality of thin laminations, as shown in Figs. 2 and 3. A second gap is provided diametrically opposite gap 12, in which is inserted a glass block element 16, preferably a piece of optically flat, leaded X-ray shield, flint, or plate glass of approximately .10 of an inch thick, and polished on both sides. The glass is substantially .5 of an inch long and .385 of an inch wide, but this glass and its adjoining magnetic pole area are not limited to these values. The laminations are of a non-symmetrical, tapered, crescent shape, one out of every four or five of which extend beyond the lines 18 and 19, so their end edges contact the sides of the glass. The laminations are approximately .003 of an inch thick, the gap 12 with pole tips being approximately .027 of an inch in depth and .25 of an inch in length, or lamination stack-height. Thus, spaces 20, as shown in Fig. 3, are provided, through which pass parallel light beams, indicated by dotted lines 22, between a polarizer prism 24 and a similar analyzer prism 25.

Light is supplied from a lamp 26, condensed by a lens 27, and impressed on a photoelectric cell 28 by a lens 29. Although the polarizers 24 and 25 are essentially cross-polarizers, the optimum orientation is found to be a slight amount off the ninety degree polarizing angle on account of certain irregular polarization effects of the optical system, and permits operation of the system without the use of a polarizing magnetic field. That is, the analyzer 24 is so oriented with respect to the average angle of polarization of the incident light that only a small fraction of the total available light is transmitted. If the analyzer is adjusted to minimize the transmission of light, and if the magnetic field is varied at a frequency $f$, the light passing through the analyzer will vary in intensity chiefly at the double frequency $2f$. To avoid this effect, the analyzer is rotated in either direction to transmit several times more than the minimum light intensity.

Referring to Figs. 2 and 3, a mounting plate 30 supports the head 11, the head, in addition to the laminations above, having mounting blocks 33 and 34 on each side of the laminations held together by a mounting screw 35, which is threaded in the block 34. Positioned within the mounting screw 35, is a smaller mounting screw which is threaded into the mounting plate 30. A beveled and knurled adjustment washer 45 is provided between the block 34 and mounting plate 30. This adjustment washer is made with a tapered thickness, from one point on the periphery to the diametrically opposite point, so that, by its rotation, the pickup gap 12 may be correctly oriented to the magnetic tape record. Surrounding the unit just described, are shielding mu metal side plates 31 and 32 and a cover shield 42 having openings 46 therein, through which the light may pass to the glass block 16. Fastened to the block 33 is a spring 41 for holding the glass 16 in position between the ends of the longer laminations 13 and 14. With respect to the form of the block 16, if the average transmitted light power is held constant, the best shape of a magneto-optical element is approximately cubical and/or symmetrical in cross-section, and of an axial length along the light beam about one to two times the square root of the cross-sectional area of the element.

Wherein the magnetic-to-light transducer of the above mentioned co-pending application provided a single light beam through the glass element, in the present head, a plurality of parallel light beams are projected through the glass element 16 and the magnetic field is distributed thereover in a more effective manner to provide a more efficient rotation of the light beam for a definite amount of magnetic variation in the core. The zones of fringing flux at the ends of the laminations in contact with the glass are utilized to produce a substantially uniform magnetic field in the glass in the direction of the polarizing light beam. In the use of the head, a good signal-to-noise ratio was obtained, and a translation of the magnetic variations in the tape-to-voltage variations from the cell 28 had a substantially flat frequency response characteristic.

By inserting the glass element itself in a magnetic field to be detected and/or measured, and by projecting the beam of light therethrough with the polarizers and photoelectric cell system described above, an accurate magnetic field detector is provided, since the presence of electrically conductive materials may be at a remote point from the region of interest, and thus, not influence the reading. The cell could be connected to an alternating current meter, cathode ray oscillograph, or other indicating device.

I claim:

1. A translating system, comprising a light-to-current translator, a signal source, means for translating said signal source into electromagnetic variations, a source of light of constant intensity, means for varying said light of constant intensity in accordance with the variations in magnetism, said means including a unit having a plurality of thin laminations separated from one another in parallel planes, certain of said laminations being separated by air spaces to permit light from said source to pass between said certain laminations, and a magneto-optical element positioned between one end of each of said certain laminations between which said light is passed.

2. A system for modulating a light beam in accordance with a signal, comprising means for generating a light beam of constant intensity, an optical element positioned in said light beam, and means for producing variations in magnetism in accordance with the signal, said means including a plurality of laminations arranged parallel to the axis of said light beam, certain of said laminations being separated by air spaces to permit said light beam to pass between said laminations and through said element, one end of each of said certain laminations being in contact with the sides of said element.

3. A light modulator unit, comprising a plurality of magnetic laminations arranged in parallel planes, a pair of gaps in said laminations, all of said laminations terminating at one gap and only certain other laminations terminating at said second gap, said last mentioned laminations providing air spaces therebetween over a portion of their length, a magneto-optical element in said second gap, means for introducing variations in magnetism in said laminations at said first gap, and means for passing light through said magneto-optical element in said second gap.

4. A light modulator unit in accordance with claim 3, in which said laminations have a greater width at said second mentioned gap than at said first mentioned gap.

5. A magnetic-to-light variation translator, comprising a plurality of laminations arranged in substantial contact in parallel planes, certain of said laminations having air spaces therebetween, means for producing varying amounts of magnetism in said laminations, means for projecting light through said air spaces between certain of said laminations and parallel to the surfaces thereof, and a light transmitting element in contact with the end edges of certain of said laminations.

6. A magnetic-to-light variation translator in accordance with claim 5, in which said laminations are essentially of modified crescent shape, one gap being provided therein at which the ends of all of said laminations terminate, and a second gap being provided therein at which certain of said laminations terminate.

7. A magnetic-to-light variation translator in accordance with claim 6, in which said laminations are tapered, the narrow ends of all of said laminations forming one gap and the wide ends of certain other laminations forming a second gap in which said light transmitting element is positioned.

8. A magneto-optical transducer of quasi-toroidal form, comprising a plurality of thin opposing laminations of modified crescent shape, a pair of gaps in said laminations, each of said laminations being narrower at one end than at the other end, means for holding said laminations in parallel planes in substantial contact with one another, all of the narrow ends of said laminations terminating to form one of said gaps, approximately every fourth lamination being longer than the other laminations and terminating to form the second of said gaps substantially diametrically opposite said first gap, and an optical element mounted between the wide ends of said longer laminations.

9. A magnetic-to-light variation transducer comprising a magnetic core, means for generating magnetic variations in said core, an optical element in a gap in said core, means for generating a light beam for projection through said element, a light polarizer in the light path between said light generating means and said element, and a second polarizer in the light path on the other side of said element, said core having a quasi-toroidal shape and including a plurality of groups of laminations of different lengths, said element being positioned against the ends of the longer laminations, said longer laminations being separated by the shorter laminations to provide light passages to said element therebetween.

ALBERT W. FRIEND.

REFERENCES CITED

The following references are of record in the file of this patent:

UNITED STATES PATENTS

| Number | Name | Date |
|---|---|---|
| 1,954,947 | Pajes | Apr. 17, 1934 |
| 1,961,706 | Pajes | June 5, 1934 |
| 2,485,839 | O'Dea | Oct. 25, 1949 |